United States Patent Office 3,377,250
Patented Apr. 9, 1968

3,377,250
WATER-IN-OIL EMULSIONS CONTAINING SULFONIUM COPOLYMERS
Kenneth Richard Hansen, Staten Island, N.Y., assignor to Colgate-Palmolive Company, New York, N.Y., a corporation of Delaware
No Drawing. Filed Nov. 13, 1963, Ser. No. 323,276
17 Claims. (Cl. 167—87)

This invention has to do with stable, water-in-oil emulsions. More specifically, the invention has to do with such emulsions particularly adapted as cosmetic compositions such as hair dressings.

A myriad of emulsions of various character have been known for many years. However, stability has been and remains today a primary problem with such compositions. Since conditions to which emulsions are exposed can vary from low temperature storage, as below 0° C., to storage at elevated temperatures, such as 50° C., as well as cyclic temperature changes of wide range, it is readily understood that equilibria characterizing emulsion can be altered such that separation of one or more components of the emulsions takes place. By virtue of the present invention such instability is lessened or obviated.

It is an object of the present invention, therefore, to provide a stable emulsion and particularly a water-in-oil emulsion. Another object of the invention is to provide a stable, hair dressing composition in the form of an aqueous emulsion. Still another object is to provide such emulsions of controlled viscosity. A further object is to provide a process for preparing the emulsions. Additional objects will be apparent from the following description.

The compositions of this invention comprise water-in-oil emulsions containing a small amount, sufficient to stabilize the emulsions, of a copolymer of an amide (A) and of a sulfonium compound (B), namely:

(A) 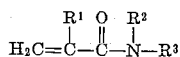

wherein $R^1$ is selected from the group consisting of hydogen, a methyl and an ethyl group; $R^2$ is selected from hydrogen and an alkyl hydroxy radical of not more than 5 carbon atoms; and $R^3$ is selected from the group consisting of an alkyl radical of 1–4 carbon atoms, and an alkyl hydroxy radical of more than 5 carbon atoms, (B) 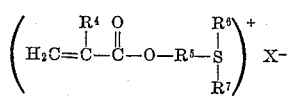

wherein $R^4$ is selected from the group consisting of hydrogen, a methyl and an ethyl group; $R^5$ is an alkylidene radical having from 2 to 12 carbon atoms; $R^6$ is an alkyl group having from 1 to 12 carbon atoms; and $R^7$ is an alkyl group having from 1 to 12 carbon atoms when X is halogen and is a methyl or an ethyl group when X is a methyl sulfate or an ethyl sulfate group, respectively.

Typical monomers represented by (A) include: acrylamide, methacrylamide, N-methyl acrylamide, N-tertiary butyl acrylamide, N-hydroxyethyl acrylamide, N-methylol acrylamide and the like. Preferred herein is acrylamide.

A typical and advantageous sulfonium compound (B) of said copolymer is 2-acryloxyethyldimethylsulfonium methylsulfate. The latter can be prepared by reacting dimethylsulfate with 2-acryloxyethyl, methyl thioether, according to the procedure given in Organic Chemistry, volume 1, second edition, 1948, John Wiley and Sons, at page 867.

While a variety of copolymers (A)(B) can be used in the compositions of this invention, particularly advantageous emulsions are formed with a copolymer of approximately 60 percent by weight of acrylamide and about 40 percent by weight of the preferred sulfonium methylsulfate mentioned above.

The copolymers (A)(B) can be formed by conventional polymerization techniques such, for example, as contacting the monomers (A) and (B) with a free radical, polymerization catalyst, as benzoyl peroxide, at a temperature from about −10° C. to 120° C.

In the water-in-oil emulsions of this invention, an oil is used. The oil can be of animal, mineral, vegetable or marine character. For example, mineral oils are typified by mineral oil, petrolatum, paraffin and microcrystalline waxes; vegetable oils are represented by fatty acid triglycerides, soybean oils, sesame oil and the like; marine oils are typified by sperm oil, and animal oils are represented by lard oil. Still other suitable oils are synthetic oils such as: aliphatic monoethers of polyoxyalkylene glycols; esters such as isopropyl palmitate and isopropyl myristate. It is to be understood that mixtures of two or more of such materials can be used in the emulsions of this invention. When used in hair dressings, such materials are generally designated "hair grooming agents."

Still other agents useful herein together with the oils mentioned above, are hair-conditioning agents such as lanolin and higher aliphatic dialkylolamides. It is to be understood that the term "lanolin" as used in the specification and claims is intended to include water-insoluble lanolin and water-insoluble fractionated lanolin containing the lanolin esters. Typical dialkylolamides are lauroyl diethanolamide, coconut fatty acid diethanolamide, lauroyl diisopropanolamide and the like.

A water-in-oil emulsifier, or a mixture of two or more of the same, is also used in preferred compositions of this invention. Suitable are: beeswax-lime; beeswax-borax; sorbitan sesquioleate; adsorption bases such as mixtures of lanolin, lanolin alcohols, mineral oil and/or petrolatum; polyoxyethylene esters of $C_{12}$–$C_{16}$ fatty acids, the esters having molecular weights of 400 to 600; calcium, zinc and aluminum stearates; neutral esters of polyhydric alcohols and of fatty acids having at least about 10 carbon atoms per molecule, and particularly polyglycerol oleate. An advantageous water-in-oil emulsifier is that formed by the reaction of a small amount of lime with a relatively larger amount of beeswax. Beeswax is a complex mixture of alkyl esters of monocarboxylic acids, cholesterol esters, free wax acids (such as cerotic), free alcohols and hydrocarbons of high molecular weight (as $C_{31}H_{64}$), and minor amounts of other material. The principal alkyl ester of beeswax is said to be myricyl palmitate.

Additional additives or compounds can be present in the water-in-oil emulsions contemplated herein. Such additives are used in customary concentration, unless otherwise specified hereinafter. These include preservatives such as formalin; anti-freeze agents and humectants such as glycerine, propylene glycol and hexylene glycol; FDA certified dyes such as F.D. & C. Yellow #5 and F.D. & C. Orange #4; thickeners such as higher fatty alcohols, e.g. stearyl alcohol; natural gums, e.g. gum arabic; cellulosic agents such as carboxy methyl cellulose. Buffering agents, such as citric acid, can be employed for pH control. The pH of the compositions of this invention generally ranges from about 6 to about 8.5, with particular preference being given to the range 6.5 to 8. Anti-seborrheic agents such as selenium disulfide can also be incorporated in the emulsions.

Water is the diluent for the foregoing components of the compositions of this invention.

Proportions of several components recited above are controlled in order to achieve desired results. The copolymer identified above is employed in concentrations of from about 0.1 to about 1, and preferably from about 0.2 to about 0.5, percent by weight. A water-in-oil emulsifier such as polyglycerol oleate is used in concentrations ranging from about 0.2 to about 1, and preferably 0.4–0.6, percent by weight. And a water-in-oil emulsifier comprising beeswax and lime is employed in amounts of the approximate range 2.5–3.5, preferably 2.7–3, percent by weight. A microcrystalline wax is particularly effective in cooperating with other components to aid stability, and is used in amounts of at least 0.1 and up to about 3, and preferably 0.15 to 0.75, percent by weight. An oil, such as a mineral oil, is present in amounts ranging from about 30 to about 60, and preferably 35 to 40, percent by weight. When lanolin and/or a dialkylolamide is used, amounts range up to about 2 percent by weight. Antifreeze agents are generally used in amounts up to about 8, and preferably about 3, percent by weight.

Although satisfactory compositions can be formed by bringing the several components of the emulsions together in accordance with a variety of procedures, it has been found that outstanding compositions are obtained by following the technique described below. An oil or a mixture of oils is heated to a temperature between about 70° C. and about 75° C. An aqueous dispersion of the copolymer, containing from about 0.1 to about 1 percent by weight thereof, is formed at 70–75° C., and is added to the oils whereupon an emulsion is formed. The emulsion is then cooled. During this preparation, the materials are thoroughly agitated in order to aid in forming the product. A further improvement is achieved by homogenizing the product. Thus, for example, the product can be homogenized while at 30–40° C. and a pressure of 100–1000 pounds per square inch gauge. Suitable homogenizers include Manton-Gaulin, Cherry Burrell and like homogenizers.

The present invention is more fully described and exemplified in the following examples. It is to be understood, however, that the invention is not to be limited to any specific form of material or conditions set forth in the examples, but is limited solely by the description in the specification and the appended claims. All quantities are expressed in parts by weight unless otherwise indicated.

Example 1

A stable, water-in-oil emulsion adapted for use as a hair dressing was formed from the following materials:

| | Parts |
|---|---|
| Mineral oil [1] | 38 |
| Microcrystalline wax [2] | 0.75 |
| Bleached white beeswax | 2.75 |
| Lanolin, U.S.P., anhydrous | 0.5 |
| Polyglycerol monooleate [3] | 0.5 |
| Copolymer [4] | 0.25 |
| Calcium hydroxide | 0.052 |
| Glycerin | 3 |
| Water | 53.748 |
| Formaldehyde | 0.2 |
| Perfume | 0.25 |

[1] White mineral oil light; viscosity of 80–95 seconds, S.U.S. at 38° C.; specific gravity of 0.834–0.864 at 25° C./25° C.
[2] Melting point of 65–68° C. (ASTM D127–30); penetration of 15–20 (100 g./25° C./5 seconds).
[3] Average of 3.5 moles of glycerol; saponification number of 136–146; hydroxyl number of 240–291.
[4] Copolymer of about 60 percent by weight of acrylamide and about 40 percent by weight of 2-acryloxyethyldimethylsulfonium methylsulfate.

Beeswax, microcrystalline wax, lanolin and polyglycerol oleate were melted in the mineral oil, which was heated to about 71° C. for 15–20 minutes. A heated dispersion of copolymer, lime, and glycerin in water, at 71° C., was added to the mineral oil, while the latter was agitated. The resulting emulsion was maintained at about 71° C. for about 30 minutes. The emulsion was then cooled to about 48° C., whereupon formaldehyde was added thereto. The emulsion was further cooled to about 44° C. and perfume was added. When further cooled to about 36° C., the emulsion was homogenized at 500–600 p.s.i.g. in a Manton-Gaulin homogenizer.

The product—Product 1—was subjected to physical stability tests at 43° C. and 49° C. for one week. No separation occurred. The product was subjected to freeze-thaw tests as measured by successive cycles of a 24 hour period at −3° C. followed by 8 hours at 24° C. Again, no separation occurred, demonstrating a high degree of stability. In contrast, a corresponding product which did not contain the copolymer was stable for only 1 day at 43° C., and withstood only two freeze-thaw cycles.

Product 1 has a viscosity of about 90,000 to about 150,000 centipoises at 25° C. with a Brookfield viscosimeter, Model RVF, using four revolutions per minute and a No. 7 spindle.

Product 1 is a particular advantageous hair dressing since it has excellent "rub-out" quality. That is, when a small amount of this product is placed in the palm of the hand and both hands are rubbed together in a flat circular motion, the Product breaks down and a clear oil is deposited on the palms. The oil can then be readily applied to the hair.

Example 2

Product 2 was formed by following the procedure given in Example 1. Materials used are the same as those employed in Example 1, unless otherwise indicated. Hydrogen peroxide was included in the heated dispersion of copolymer, lime and glycerin.

| | Parts |
|---|---|
| Mineral oil | 38 |
| Microcrystalline wax | 0.2 |
| Bleached white beeswax | 2.75 |
| Lanolin | 0.5 |
| Polyglycerol oleate | 0.5 |
| Copolymer | 0.25 |
| Calcium hydroxide | 0.052 |
| Glycerin | 3 |
| Water | 53.748 |
| Hydrogen peroxide (30%) | 0.1 |
| Formaldehyde | 0.2 |
| Perfume | 0.5 |

The compositions contemplated herein have a Brookfield viscosity range of from about 10,000 to about 250,000 centipoises using the viscosimeter and conditions mentioned above. Viscosity can be controlled by suitable selection of components and concentrations thereof, and suitable selection of homogenization conditions. For example, Product 2 is ideally adapted for use as a hair dressing having a viscosity of 50,000–75,000 centipoises, suitable to be dispensed from a plastic (e.g. polyethylene) squeeze bottle. The emulsions can be in the physical form of a cream, dispensable from a tube or a jar, or a liquid, dispensable from a bottle or like container.

Although the present invention has been described and illustrated with reference to specific examples, it is understood that modifications and variations of composition and procedure may be made by those skilled in the art within the principle and scope of the invention as expressed in the appended claims.

I claim:

1. A stable, water-in-oil emulsion comprising an oil and water, an emulsifying agent selected from the group consisting of beeswax-lime, beeswax-borax, sorbitan sesquioleate, lanolin, lanolin alcohols, mineral oil, pertolatum, polyoxyethylene esters of $C_{12}-C_{16}$ fatty acids, said esters having a moleculer weight within the range of from about 400 to about 600, calcium, zinc and aluminum stearates, neutral esters of polyhydric alcohols and of fatty acids having at least about 10 carbon atoms per molecule and mixtures of two or more of the foregoing, and a small amount, sufficient to stabilize a water-in-oil emulsion formed thereof, of a copolymer of an amide (A) represented by the formula

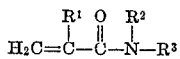

wherein $R^1$ is selected from the group consisting of hydrogen, methyl and ethyl; $R^2$ is selected from hydrogen and alkyl hydroxy of not more than 5 carbon atoms; and $R^3$ is selected from the group consisting of hydrogen, alkyl of 1–4 carbon atoms, and alkyl hydroxy of more than 5 carbon atoms, and a sulfonium compound (B) represented by the formula

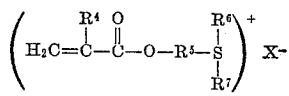

wherein $R^4$ is selected from the group consisting of hydrogen, methyl and ethyl; $R^5$ is alkylidene having from 2 to 12 carbon atoms; $R^6$ is alkyl having from 1 to 12 carbon atoms; and $R^7$ is alkyl having from 1 to 12 carbon atoms when X is halogen, and is slected from the group consisting of methyl and ethyl when X is, respectively, methyl sulfate and ethyl sulfate and copolymer consists of approximately 60% by weight of units of Formula (A) and approximately 40% by weight of units of formula B.

2. An emulsion defined by claim 1 wherein the copolymer is present in an amount from about 0.1 to about 1 percent by weight of the emulsion.

3. An emulsion defined by claim 1 wherein said copolymer is formed of (A) acrylamide and (B) 2-acryloxyethyldimethylsulfonium methylsulfate.

4. A stable, hair dressing composition in the form of an aqueous emulsion comprising, in parts by weight:
 (a) from about 30 to about 60 parts of a hair grooming agent comprising an oil;
 (b) from about 0.2 to about 1 part of an emulsifying agent selected from the group consisting of beeswax-lime, beeswax-borax, sorbitan sesquioleate, lanolin, lanolin alcohols, mineral oil, petrolatum, polyoxyethylene esters of $C_{12}-C_{16}$ fatty acids, said esters having a molecular weight within the range of from about 400 to about 600, calcium, zinc and aluminum stearates, neutral esters of polyhydric alcohols and of fatty acids having at least about 10 carbon atoms per melecule and mixtures of two or more of the foregoing;
 (c) from about 0.1 to about 1 part of a copolymer of an amide (A) represented by the formula

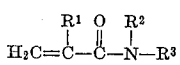

wherein $R^1$ is selected from the group consisting of hydrogen, methyl and ethyl; $R^2$ is selected from hydrogen and alkyl hydroxy of not more than 5 carbon atoms; and $R^3$ is selected from the group consisting of hydrogen, alkyl of 1–4 carbon atoms, and alkyl hydroxy of more than 5 carbon atoms, and a sulfonium compound (B) represented by the formula

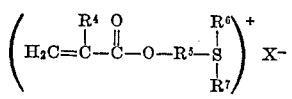

wherein $R^4$ is selected from the group consisting of hydrogen, methyl and ethyl; $R^5$ is alkylidene having from 2 to 12 carbon atoms; $R^6$ is alkyl having from 1 to 12 carbon atoms; and $R^7$ is alkyl having from 1 to 12 carbon atoms when X is halogen, and is selected from the group consisting of methyl and ethyl when X is, respectively, methyl sulfate and ethyl sulfate, said copolymer consists of approximately 60% by weight of units of Formula A and approximately 40% by weight of units of Formula B.

5. A composition defined by claim 4 wherein the hair grooming agent is mineral oil.

6. A composition defined by claim 4 wherein the hair grooming agent is microcrystalline wax.

7. A composition defined by claim 4 wherein the emulsifying agent is polyglycerol oleate.

8. A composition defined by claim 4 wherein said copolymer is formed of (A) acrylamide and (B) 2-acryloxyethyldimethylsulfonium methylsulfate.

9. A composition defined by claim 4 also containing up to about 8 percent by weight of polyhydroxy alcohol.

10. A composition defined by claim 4 also containing up to about 8 percent of glycerin.

11. A composition defined by claim 4 also containing up to about 2 percent by weight of lanolin.

12. A composition defined by claim 4 wherein the emulsifying agent comprises an ester of glycol and a fatty acid having at least about 10 carbon atoms per molecule.

13. The composition defined by claim 4 wherein the emulsifying agent is beeswax-lime.

14. A stable hair dressing composition comprising:

| | Approximate percent by weight |
|---|---|
| Mineral oil | 38 |
| Microcrystalline wax | 0.75 |
| Beeswax | 2.75 |
| Calcium hydroxide | 0.05 |
| Lanolin | 0.5 |
| Polyglycerol oleate | 0.5 |
| Copolymer | 0.25 |
| Glycerin | 3 |
| Water | Balance | said copolymer comprising about 60 percent by weight of acrylamide and about 40 percent by weight of 2-acryloxyethyldimethylsulfonium methylsulfate.

15. A stable hair dressing composition comprising:

| | Approximate percent by weight |
|---|---|
| Mineral oil | 38 |
| Microcrystalline wax | 0.2 |
| Beeswax | 2.75 |
| Calcium hydroxide | 0.05 |
| Lanolin | 0.5 |
| Polyglycerol oleate | 0.5 |
| Copolymer | 0.25 |
| Glycerin | 3 |
| Hydrogen peroxide | 0.3 |
| Formaldehyde | 0.2 |
| Perfume | 0.5 |
| Water | Balance | said copolymer comprising about 60 percent by weight of acrylamide and about 40 percent by weight of 2-acryloxyethyldimethylsulfonium methylsulfate.

16. The process for forming a stable hair dressing composition, which comprises: heating a mixture comprising from about 30 to about 60 parts of mineral oil, from about 0.1 to about 3 parts of microcrystalline wax, and from about 2 to about 5 parts of beeswax to a temperature between about 70° C. and about 75° C.; adding to the said heated mixture a dispersion, at a temperature between about 70° C. and about 75° C., comprising from about 0.1 to about 1 part of the copolymer defined in claim 4, from about 0.04 to about 0.1 part by weight of calcium hydroxide, and from about 50 to about 60 parts by weight of water, to form an emulsion; and cooling said emulsion.

17. The process defined by claim 16 wherein the resulting composition is homogenized.

References Cited

UNITED STATES PATENTS

| 3,207,656 | 9/1965 | Eldred et al. | 260—79.7 XR |
| 3,214,370 | 11/1965 | Bailey et al. | 260—79.7 X |
| 3,280,081 | 10/1966 | La Combe et al. | 260—79.7 |

ALBERT T. MEYERS, *Primary Examiner.*

JULIAN S. LEVITT, *Examiner.*

V. C. CLARKE, *Assistant Examiner.*